United States Patent [19]
Kopetz

[11] Patent Number: 5,694,542
[45] Date of Patent: Dec. 2, 1997

[54] TIME-TRIGGERED COMMUNICATION CONTROL UNIT AND COMMUNICATION METHOD

[75] Inventor: Hermann Kopetz, Baden, Austria

[73] Assignee: Fault Tolerant Systems FTS-Computertechnik Ges.m.b., Baden bei Wien, Austria

[21] Appl. No.: 562,337

[22] Filed: Nov. 24, 1995

[51] Int. Cl.[6] .................... G06F 11/00; G06F 11/10
[52] U.S. Cl. ................ 395/185.02; 395/185.03; 395/185.04; 395/185.05; 395/184.01
[58] Field of Search ............... 395/182.08, 185.01, 395/185.02, 185.03, 185.04, 185.05, 185.06, 185.07, 184.01, 183.07, 182.16, 200.11, 200.13; 364/264, 266.3; 455/9, 39, 67.1, 115

[56] References Cited

U.S. PATENT DOCUMENTS

| | | | |
|---|---|---|---|
| 4,241,398 | 12/1980 | Carll | 395/200.17 |
| 4,534,023 | 8/1985 | Peck et al. | 370/384 |
| 4,598,404 | 7/1986 | Perry et al. | 371/49.1 |
| 4,646,298 | 2/1987 | Laws et al. | 371/10.2 |
| 4,646,300 | 2/1987 | Goodman et al. | 371/33 |
| 4,947,484 | 8/1990 | Twitty et al. | 371/37.1 |
| 4,956,641 | 9/1990 | Matai et al. | 340/825.44 |
| 4,980,906 | 12/1990 | Forson et al. | 379/32 |
| 5,428,629 | 6/1995 | Gutman et al. | 371/37.1 |

Primary Examiner—Hoa T. Nguyen
Attorney, Agent, or Firm—Thomas R. Vigil

[57] ABSTRACT

The time-triggered communication control unit and method for the transmission of messages within a distributed real time computer architecture consist of a plurality of fault-tolerant units, in which the information to be transmitted consists of a control field (K), a data field (D) and a CRC (Cyclic Redundancy Check) field (CRC). The contents of the CRC field are calculated over the concatenation of the control field (K), the data field (D) and the local internal state of the transmitting communication control unit. The local internal state of such a communication control unit consists of a concatenation of the global time with a membership field. The membership field is composed of a sequence of bits, where each bit is assigned to a unique fault-tolerant unit. The value TRUE of a membership bit means that the assigned fault-tolerant unit is operating, the value FALSE means that it is faulty. By recalculating the CRC with its internal state, the receiving communication control unit can recognize both incorrect information or a difference between the internal states of the transmitting and the receiving communication control unit.

15 Claims, 5 Drawing Sheets

TIME-TRIGGERED COMMUNICATION CONTROL UNIT AND COMMUNICATION METHOD

BACKGROUND OF THE INVENTION

1. Field of the Invention

The present invention relates to a time-triggered communication control unit and a time-triggered communication method for the transmission of messages within a distributed real-time computer architecture. This communication method provides a number of services that are needed for the implementation of fault-tolerance.

2. Description of the Prior Art

Distributed hard real-time computer systems, i.e. systems where a failure to meet a deadline can cause catastrophic consequences, are replacing an increasing number of conventional mechanical or hydraulic control systems, particularly in the transportation sector. The vastly expanded functionality of a digital control system makes it possible to implement advanced control algorithms that increase the quality of control far beyond the level that is achievable by a conventional control system. In safety critical applications, such as a "brake by wire" system in an automobile, no single point of failure may exist, i.e., the distributed computer system must tolerate a failure of any one of its parts. Therefore, the demand for fault-tolerant distributed real-time computer architectures is growing. At the core of such a computer architecture is a real-time communication system that supports the predictable transmission of messages and provides the basic services needed for the implementation of fault-tolerance.

In a real-time communication system it is desired to keep the length of a message as short as possible and the number of administrative messages as small as possible, in order that a prompt reaction of the system can be supported under the given bandwidth limitation of the communication channel. A minimal message length and a small number of administrative messages are important economic factors for fast time critical processes, because an increase of the bandwidth does result in higher costs, e.g., in the automotive or aerospace-electronics sector, where a twisted wire cable with limited bandwidth is used for the physical interconnection of the node computers.

The implementation of fault-tolerance within a distributed real-time computer architecture is simplified if the communication system provides the following services: predictable transmission of messages, a fault-tolerant clock synchronization, a membership service to detect consistently and timely the operational state of each node computer, a temporal firewall between the node computers to eliminate the propagation of control errors, the detection of transient and permanent message losses, a distributed redundancy management, and a fast and consistent mode switch in case of an emergency. Basic procedures for the transmission of messages are well known in the prior art, e.g., under the labels of J1850, CAN, and Token Slot Network (1992 SAE handbook, Vol., pp. 20.301–20.302, Society of Automotive Engineers, 400 Commonwealth Drive, Warrendale, Pa., USA). Since these basic transmission procedures do not provide all the services mentioned above the prior art proposes the implementation of layered protocols, e.g., for clock synchronization or for a membership service. These layered protocols require the transmission of many additional administrative messages by the communication system. The problems with this prior art approach are:

(1) Each one of these administrative messages requires additional bandwidth that is taken away from the application at hand. In total, the data efficiency of the communication system is notably reduced thus leading to higher communication costs.

(2) The time-delay between the different administrative messages makes it difficult to reason about the state of the system at any particular point in time, since a significant event that occurs between any two administrative messages compromises the consistency of the receiver's view.

(3) The lack of predictability and determinism of many of the communication systems proposed in the prior art makes it difficult to implement fault-tolerance by active redundancy.

Most of the protocols that are part of the prior art are event-triggered, meaning that a communication action is started whenever an important event occurs in the node computer or in the environment. In contrast to this, a protocol is called time-triggered if a communication action is started at a predetermined recurring point in time. In general the predictability of a time-triggered protocol is superior to that of an event-triggered protocol. A good example of a time-triggered protocol that is part of the prior art is the time-division multiple access (TDMA) scheme, where each node computer knows at what point in time the channel will be free so that it can send its messages. However, the prior art TDMA protocols only provide the basic communication service, such that the additional services stated above have to be implemented in layers above the basic TDMA layer, leading to the same problems as noted above.

Furthermore, the implementation of TDMA requires the synchronization of all real-time clocks of the node computers. A fault-tolerant procedure for the synchronization of clocks is disclosed in U.S. Pat. No. 4,866,606, dated December 1989 by Kopetz, H. (for an explanation of the clock synchronization theory see also: Kopetz, H.; and Ochsenreiter, W.; Clock Synchronization in Distributed Real-Time Systems, IEEE Transactions on Computers, vol. C-36, pp. 933–940, August 1987).

SUMMARY OF THE INVENTION

It is an object of the present invention to provide an integrated effective and efficient communication method and a communication controller that on the one hand achieves the predictable and reliable transfer of real-time data between a plurality of node computers connected to replicated broadcast buses and on the other hand provides the following services needed for the implementation of a fault-tolerant real-time system:

(a) Synchronization of the local clocks.

(b) Membership service for the consistent detection of node computer failures.

(c) The establishment of temporal firewalls between node computers to eliminate the possibility of control error propagation.

(d) Detection of a transient or permanent message loss.

(e) Distributed redundancy management, i.e., the consistent removal of failed node computers and the reintegration of the repaired node computers.

(f) Prompt reaction in emergencies.

These and other objects, features and advantages of the invention are accomplished by the innovative time-triggered communication method and controller disclosed herein. This new communication method is executed autonomously in the communication control unit of each node computer and provides a simple interface to the application software. This new method also provides a deterministic and conflict free access to the common communication bus and is thus predictable and deterministic. It simplifies the implementation of fault-tolerance by active redundancy. It reduces substantially the number of administrative messages and the length of the messages by making use of the a priori known information about the temporal behavior of the communication control units and the current information about the operating behavior of the communication control units. By always sending a number of replicas of every logical message on the possibly replicated physical buses, this new communication method can tolerate a specified number of single and correlated message faults with minimal latency jitter. A small latency jitter is very important if a control loop is closed via a distributed computer system.

BRIEF DESCRIPTION OF THE DRAWINGS

The above described and other objects, features and advantages of the invention will be more fully appreciated from the following description with reference to the accompanying figures wherein.

DESCRIPTION OF THE PREFERRED EMBODIMENT(S)

Figure 1:
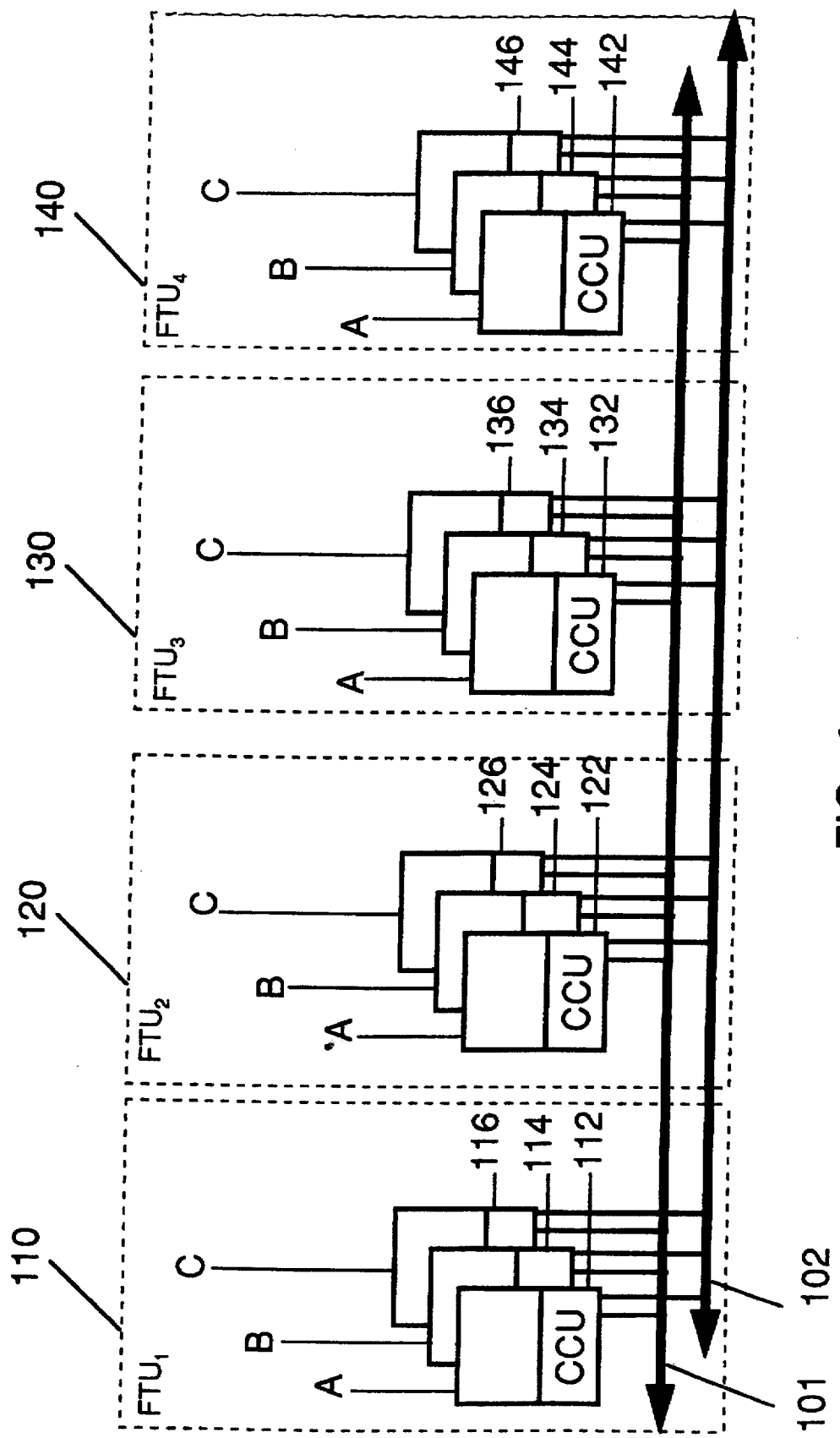
FIG. 1 is a block diagram of a distributed node computer system with four Fault-Tolerant Units, each one comprising two active node computers and one shadow node computer. Every node computer is connected to two replicated communication buses.

Referring now to FIG.1 in greater detail, there is illustrated a distributed real-time fault-tolerant computer system comprising four Fault-Tolerant Units (FTU) 110, 120, 130, and 140. Since all four FTUs are structurally identical, only FTU 110 is described in detail. It comprises an active node computer A with a Communication-Control Unit (CCU) 112, a second active node computer B with CCU 114 and a semi-active shadow node computer C with CCU 116. Every one of these node computers is connected to the replicated broadcast buses 101 and 102. Every broadcast bus supports the data transfer from any one node computer to all other node computers of the distributed computer system. The two active node computers A and B provide the same replica determinate service and send replicated messages on the broadcast buses 101 and 102. The shadow node computer C receives messages only and has no right to send a message. If one of the node computers A or B fails to send a message, the shadow node computer C will detect the failure and start sending messages. As long as one of the node computers of an FTU is operational, the FTU provides the specified timely service. Such a fault-tolerant architecture is known in the prior art and described in detail in Kopetz, H., Kantz, H., Grünsteidl, G., Puschner, P., & Reisinger, J., Tolerating Transient Faults in MARS. *Proc. 20th Int. Symp. on Fault-Tolerant Computing* (FTCS-20), (pp. 466–473). Newcastle upon Tyne, UK, 1990. This fault-tolerance strategy makes the assumption that all node computers are fail-silent, i.e. they either produce the correct result at the correct time or do not produce any result at all (fail silence). It is known in the prior art how to build a fail-silent node computer, see e.g., Reisinger, J., Steininger, A., & Leber, G. The PDCS Implementation of MARS Hardware and Software. In: B. Randell, J. L. Laprie, H. Kopetz, & B. Littlewood (Ed.), *Predictably Dependable Computing Systems* (pp. 209–224). Heidelberg: Springer Verlag, 1995. The fail-silence property of the above cited node computer has been validated experimentally with fault-injection experiments. (See: Karlsson, J., Folkesson, P., Arlat, J., Crouzet, Y., & Leber, G. Integration and Comparison of Three Physical Fault Injection Techniques. In: B. Randell, J. Laprie, H. Kopetz, & B. Littlewood (Ed.), *Predictably Dependable Computing Systems* (pp. 309–327). Heidelberg: Springer Verlag, 1995.)

Figure 2:
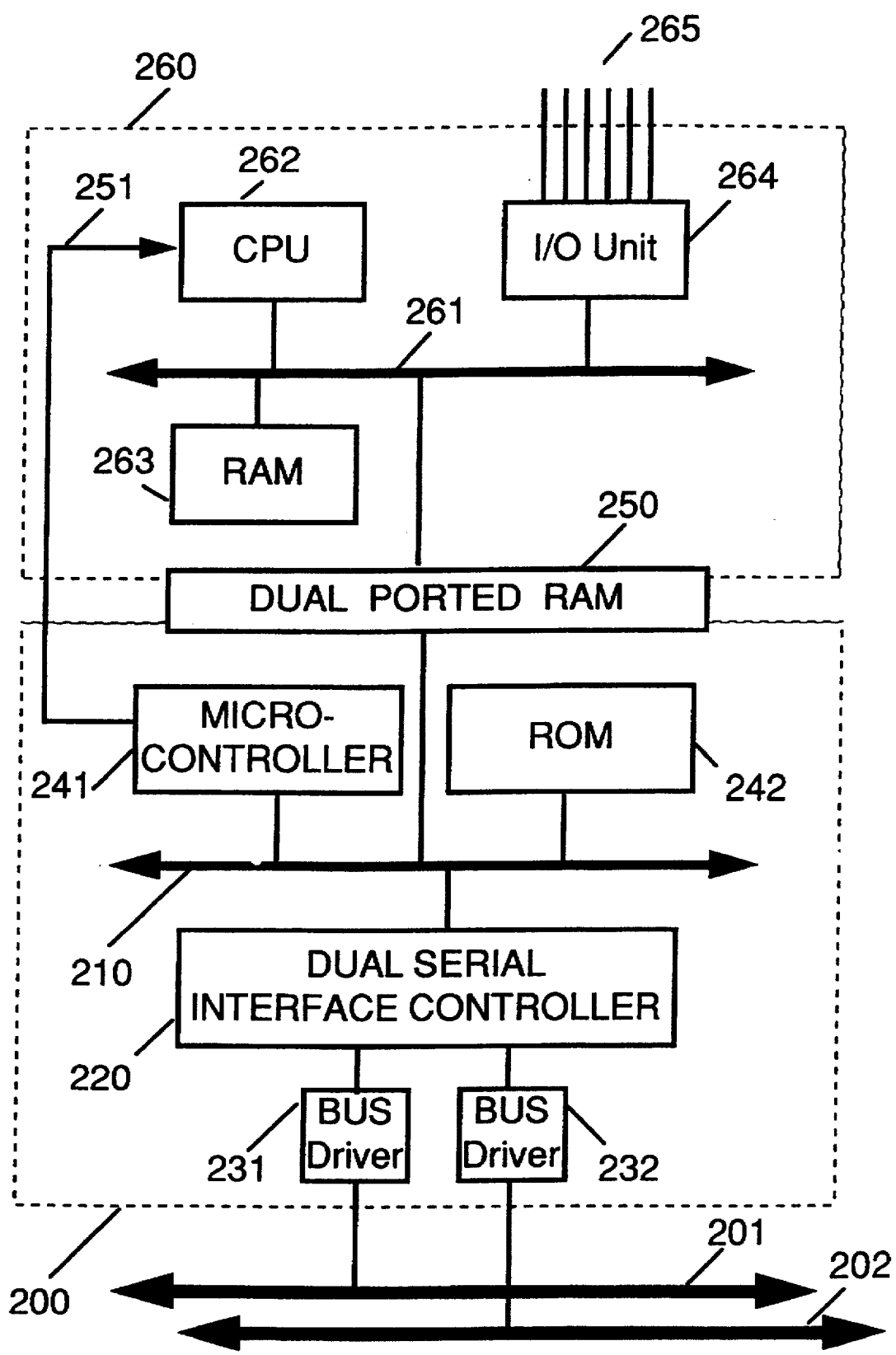
FIG. 2 is a block diagram of a node computer comprising a communication controller and a host processor.

Referring to FIG. 2, a possible internal structure of a node computer is shown. This particular node computer is constructed out of standard off-the-shelf components. The node computer comprises two subsystems, the communication control unit 200 and the host computer 260. The communication control unit (CCU) has its own microcontroller 241. This microcontroller may be an industry standard Motorola part MC 68332 which has an internal RAM (random-access memory) and an internal time-processing unit (TPU) that is well suited to perform the precise time measurements required by this new time-triggered communication method. This micrcontroller 241 is connected to the other subsystems of the CCU by an industry standard internal bus 210 that is known in the art. The program of the microcontroller and the data structures that control the messages to be sent and received on the replicated buses 201 and 202 are contained in the ROM (Read-Only Memory) 242. The messages are assembled and disassembled by the dual serial interface controller 220. This can be an industry standard part Zilog Z16C3010. This interface controller 220 generates and receives the logical transmission signals from the two bus drivers 231 and 232 that are connected to the two replicated broadcast buses 201 and 202. These broadcast buses 201 and 202 are identical to the broadcast buses 101 and 102 of FIG. 1. The two bus drivers 231 and 232 can be industry standard parts, such as the Philips PCA82C250.

The interface between the CCU 200 and the host computer 260 in the FIG. 2 is realized by a digital output line 251 and a Dual Ported Random Access Memory (DPRAM) 250 that can be accessed from both, the CCU 200 and the host computer 260. The digital output line 251 supplies a globally synchronized time signal to the host computer 260 from the CCU 200. This digital output line 251 corresponds to the digital output line defined in claim one U.S. Pat. No. 4,866,606. This unidirectional signal is the only control signal that passes the interface between the CCU and the host computer. The DPRAM 250 contains the data structures that are sent from the host computer 260 to the CCU 200 and vice versa as well as control and status information.

The hardware architecture of the host computer 260 is a conventional one well known in the art. It comprises a CPU 262, a random-access memory (RAM) 263 and an Input/Output Unit 264 that provides the input/output signals 265 to the environment for control purposes. All these devices are connected by an industry standard bus 261.

Figure 3:
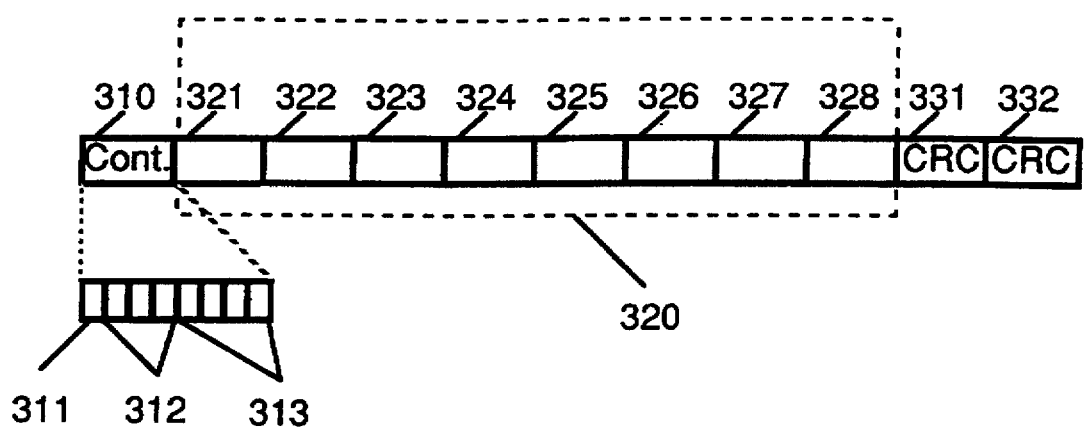
FIG. 3 is a plan view of a format of a typical message as it is transmitted on the communication bus.

Referring to FIG.3, the format of a message that is sent on the broadcast bus 101 and 102 of FIG. 1 is shown. This message comprises a control field 310, a variable number of data bytes 320, in our example the eight bytes 321, 322, 323, 324, 325, 326, 327, 328 and two bytes 331 and 332 for the Cyclic Redundancy Check Field(CRC). The control field 310 has three subfields, an initialization field 311 that has a length of one single bit, a mode change field 312 that has a length of three bits, and an acknowledgment field 313 that has a length of four bits. There is no need to carry an identifier field in the message, since the a priori known point in time of message arrival is sufficient to uniquely identify every message. The elimination of the identifier field reduces the message length and thus improves the data efficiency 6f this new communication method.

Figure 4:
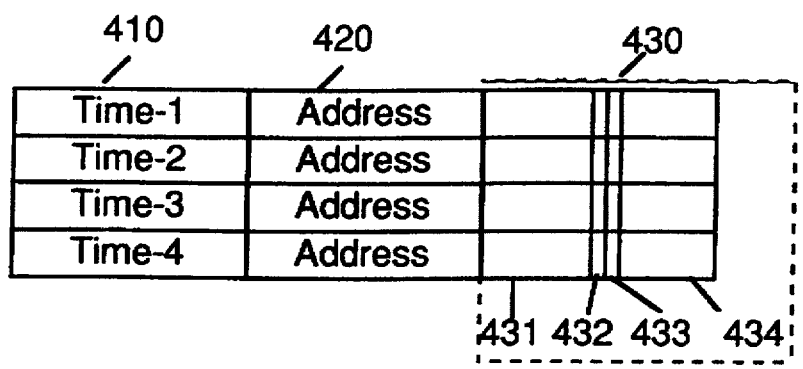
FIG. 4 is a plan view of the data format of a Message Descriptor List (MEDL) as it is stored in the ROM of the communication controller.

FIG. 4 shows the data structure for a possible implementation of the Message Descriptor List (MEDL) that controls the communication traffic on the broadcast buses 101 and 102 of FIG. 1. This data structure comprises three fields, a time field 410, an address field 420, and an attribute field 430. The time field 410 contains the point in time when the message specified in the address field 420 has to be communicated. The address field 420 points to the data in the DPRAM 250 of FIG. 2 where the data has to be stored or retrieved. The attribute field 430 comprises four subfields, a length subfield 431, denoting the length of the message that is to be communicated, an input/output subfield 432 that specifies if the message is an input message or an output message, an initialization field 433 that specifies whether the message is an initialization message or a normal message, and an allocation field 434 that specifies in what order the replicated messages have to be sent on the replicated broadcast buses.

Figure 5:
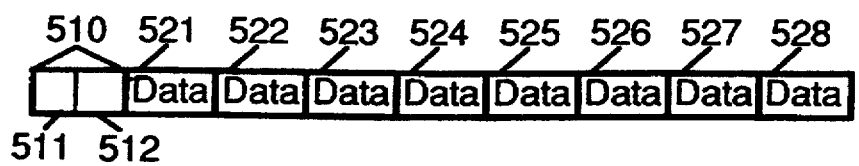
FIG. 5 is a plan view of the data format of an entry into the Message Base as it is stored in the Dual Ported RAM of a node computer.

FIG. 5 shows the format of the data in the Message Base Interface in the DPRAM 250 of FIG. 2. The first byte of this data structure is a status byte 510 with two subfields, the receive status subfield 511 and the concurrency control subfield 512. The receive status subfield 511 informs the host computer whether the reception of the data contained in fields 521 to 528 was correct or erroneous. The concurrency control subfield 512 controls the concurrent access to the data from the host computer 260 and the communication controller 200 of FIG. 2. The data bytes 521 to 528 contain the data bytes that have been transported in the message of FIG.3., i.e., they are a copy of the data bytes 321 to 328.

Figure 6:
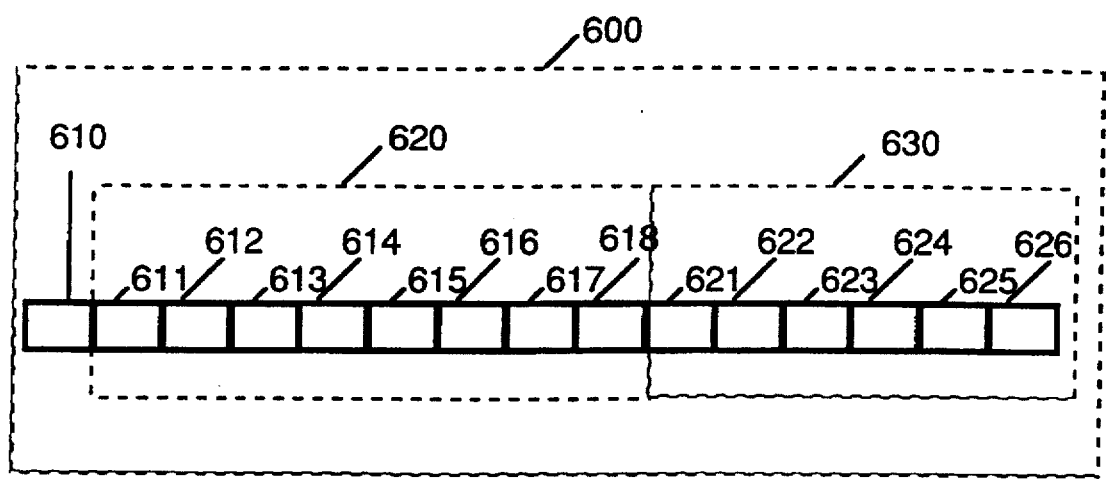
FIG. 6 is a plan view of the data structure that is used for the CRC calculation of normal messages.

FIG.6 shows the data structure 600 that is used for the CRC calculation of normal messages at the sender and receiver. It contains three fields, the control field 610, the eight data bytes 620 contained in the message data area (bytes 321 to 328 of FIG. 3), and the communication controller state (C-state) 630. The C-state 630 has three subfields, the current time in bytes 621 and 622, the current mode in bytes 623 and 624, and the current membership field in bytes 625 and 626. The current time in bytes 621 and 622 is the globally synchronized time in a sixteen bit representation as seen by the sender and receiver. The current mode is defined by the name 623 of the active message descriptor list (MEDL) and the position within the MEDL in byte 624. The membership fields 625 and 626 contain a sixteen bit vector denoting up to sixteen distinct Fault-Tolerant Units (FTU) within the distributed computing system. If the bit of the membership fields 625 and 626 that is assigned to a particular FTU is TRUE then this FTU is operating correctly at the point in time contained in fields 621 and 622. If this bit is FALSE then the corresponding FTU is not operating correctly.

Figure 7A:
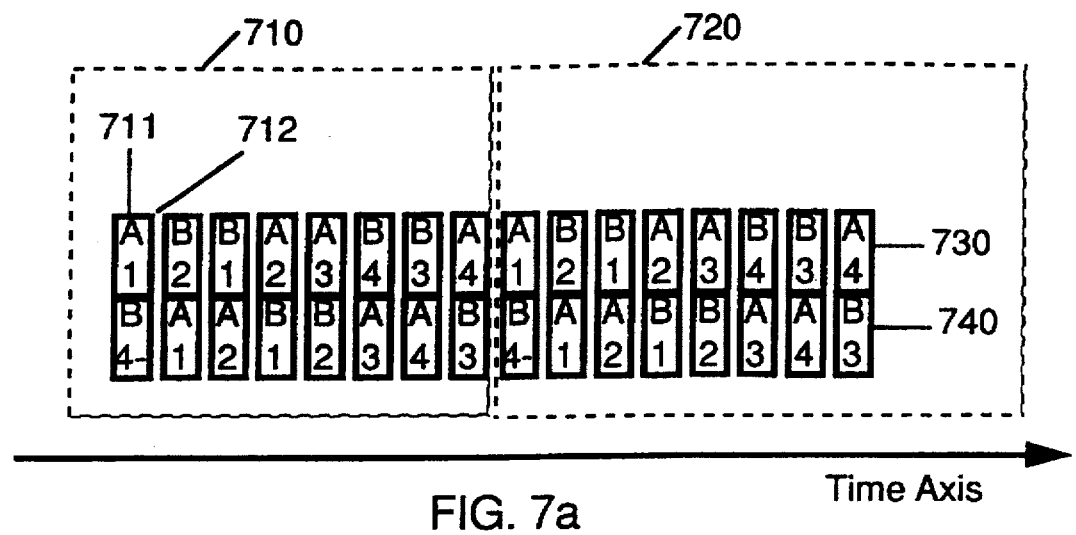
FIG. 7a is a plan view of the message allocation in two consecutive TDMA rounds.

FIG. 7a shows the messages that are sent on the two replicated buses of FIG.1 during subsequent TDMA rounds, rounds 710 and 720. The messages on bus 101 are shown in row 730 and the messages on bus 102 are shown in row 740. During the first time slot 711 two messages are sent, a message from computer node A (i.e. A on FIG. 1) belonging to FTU 1 (i.e., 110 on FIG. 1) and a message from computer node B (i.e. B on FIG. 1) belonging to FTU 4 (i.e., 140 on FIG. 1). The minus in 711 denotes that the message of FTU 4 belongs to the previous TDMA round. The intermessage gap between two messages is depicted by the interval 712.

Figure 7B:
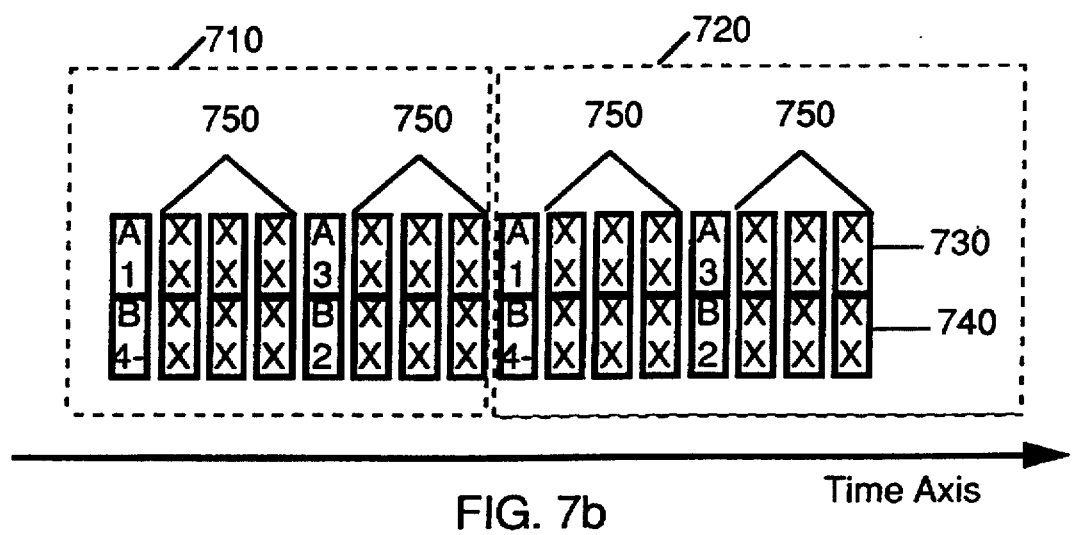
FIGS. 7b and FIG. 7c illustrate the robustness of this allocation scheme with respect to correlated transient transmission faults.

FIG. 7b shows that correlated transient errors 750 that destroy three consecutive messages on both buses, as denoted by the XXX in the corresponding message slots, are tolerated by this communication method, since in every TDMA slot at least one message from each FTU of FIG.1 is still transmitted correctly.

Figure 7C:
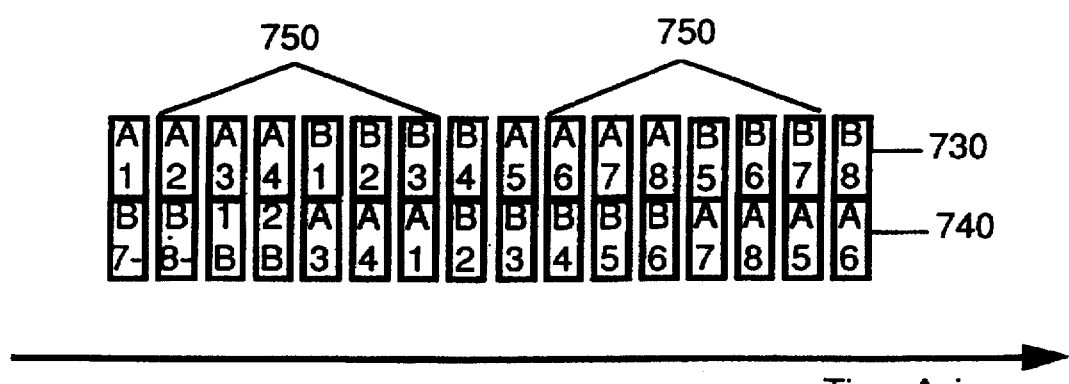

FIG. 7c shows a message allocation in a system with eight FTUs that tolerates the destruction of up to six messages on both buses.

After having described the building blocks and significant data structures of the communication control unit we are now in the position to demonstrate the operation of this new time-triggered communication method.

Prior to operation, the Message Descriptor Lists (MEDL) have to be generated for each node computer and loaded into the Read Only Memory (ROM) 242 of FIG.2. The MEDL specifies at what point in time 410 of FIG. 4, a node computer has to send or to receive a particular message. In addition to the MEDL a distinct startup timeout parameter denoting the time between power up and the transmission of the first initialization message (I-Message) has to be available in the Read Only Memory (ROM) 242 of each node computer.

After power up, a node computer waits until the startup time has elapsed and then sends the first initialization message. The first initialization message has the format described in FIG.3 with a TRUE value in 311 and FALSE values in 312 and 313 of byte 310. The data field 320 of this initialization message contains the C-state of the sending communication control unit (CCU), i.e., the field 630 described in FIG. 6. The CRC of I-messages is calculated according to a standard procedure (e.g., CCITT, The Orange Book, VIII.1 cited above, pp. 171–173) that is well known in the art over the fields 310 and 320 of FIG. 3. and stored in bytes 331 and 332 of the message. A receiving communication control unit (CCU) decodes this message as an I-message by inspecting bit 311 of FIG. 3. Then the receiver performs a CRC check to verify the correctness of this message, applying the standard procedure well known in the art. If this CRC check of the I-message at the receiver fails, the receiver waits until another node computer sends an I-message and tries to reintegrate itself again. If the I-message is correct, then the receiver copies the contents of the I-message data field 320 into its C-state, thus synchronizing the C-state of the receiver with the C-state of the sender. The node computers start sending messages according to the current MEDL contained in the ROM 242, FIG. 2, of the communication controller. In case there is an error in the initialization bit 311, FIG. 3, that is used to distinguish between an initialization message and a normal message, the wrong CRC check will be applied and the corrupted message will be discarded according to this invention.

If the subfield 433 of FIG.4 is TRUE, meaning that the message is a normal message, the following innovative algorithm for CRC calculation is applied to continually maintain consistency between the Controller State (C-State) of the sender with the Controller State (C-State) of the receiver. The CRC-field of normal messages, which are also identified by a FALSE value in bit 311, FIG.3, is calculated over the data structure 600, FIG. 6. This data structure 600 is formed by the concatenation of the control field 610, the data field 620, and the C-State 630 of the sending communication control unit. To reduce the message length, the C-state of the sender 630 is not part of the physical message as depicted in FIG. 3. The receiving communication control unit (CCU) performs the CRC check over the concatenation of the received control field 610, the received data field 620 and the C-state 630 of the receiver. The receiving communication control unit can thus detect mutilated messages as well as a deviation of the C-State of the sending communication control unit from the C-State of the receiving communication control unit.

In other embodiments of this invention it may be useful to expand the C state of the communication control unit by additional information, e.g., by cryptographic information, to check for the equality of this additional information at the sender and receiver by the same innovative method. Different operating modes may support different message formats or different transmission rounds.

When the MEDL is finished it is started anew at its beginning. Thus, messages are sent periodically according to a Time Division Multiple Access (TDMA) scheme controlled by the MEDL. Whenever a new version of a message arrives, it is stored in the DPRAM 250, FIG.2, at the address specified in the MEDL field 420, FIG. 4. The concurrency control byte 512, FIG.5, is updated according to an algorithm that is known in the prior art (Kopetz, H., & Reisinger, J. The Non-Blocking Write Protocol NBW: A Solution to a Real-Time Synchronisation Problem. *Proc. 14th Real-Time Systems Symposium*, Raleigh-Durham, N.C. 1993).

A receiving communication control unit CCU, 112 etc., FIG. 1, marks a fault-tolerant unit in its membership field 625 and 626, FIG. 6, as faulty, if none of the expected messages of this fault-tolerant unit arrives with a correct CRC field at the receiving communication control unit during the known time slot of this fault-tolerant unit as specified in its MEDL field 410 FIG. 4. Based on this prior knowledge about the expected message arrival time, the receiver distinguishes between two different kinds of failures: either no message has been received in the specified time interval or a message with a faulty content (an erroneous CRC check) has been received. The receiver counts the number of messages with a CRC error in a CRC-error counter. The receiver counts the number of messages with a correct CRC in a OK-counter. Both counters are set to zero immediately after the sending timeslot owned by the receiver.

According to its local membership field 625 and 626, FIG. 6, the first active successor of the previously sending fault-tolerant unit FTU acknowledges in the first bit of field 313, FIG. 3, a correctly received message from the node computer A of the preceding fault-tolerant unit (FTU). The second bit of field 313, FIG. 3, acknowledges a correctly received message from the node computer B of the preceding fault-tolerant unit (FTU). The second active successor of a sending FTU acknowledges the receipt of the messages in the second two bits of field 313 accordingly.

Immediately before sending, a sending node computer decides whether it is faulty. A node computer considers itself faulty if:

(1) one of its local fault detection mechanism reports a fault; or (2) none of the messages, which it has sent in its last sending time slot, has been acknowledged by any one of the node computers of the succeeding fault-tolerant units (FTU) or the successor of the succeeding FTU; or (3) the content of its OK-counter is smaller than the content of its CRC-error counter.

If the communication control unit considers itself as faulty, it sends no further message, switches into a fault handling mode, and initializes a recovery.

The described procedure also operates correctly if a communication control unit (CCU) appears several times within a transmission round.

To maintain clock synchronization, the clocks of all node computers have to resynchronize each other periodically. It is known in the art that each node computer has to measure periodically the deviation of the state of its clock from the state of the clocks of the other node computers in order to calculate the clock adjustment that is required to maintain synchronism. According to this invention, the measurement of the clock differences proceeds as follows: Every node computer knows a priority by referring to the contents of the MEDL field 410, FIG. 4 stored in its ROM 242, FIG. 2, when a message is expected to arrive. The actual point in time of message arrival is detected by the interface controller 220 and reported to the microcontroller 241 via the internal bus 210. The microcontroller 241 immediately reads its real-time clock to record the actual point in time of the arrival of the message. The time difference between the expected point of arrival and the actual point of arrival, corrected by a known constant delay term, is a measure of the difference between the state of the clock of the sender and the state of the clock of the receiver. Within a TDMA round, a given node computer thus measures the time differences to all other node computers. These time differences form the input values to a clock synchronization algorithm that is known in the art (see, e.g, Kopetz, H.; and Ochsenreiter, W.; Clock Synchronization in Distributed Real-Time Systems, IEEE Transactions on Computers, vol. C-36, pp. 933–940, August 1987), This algorithm is executed periodically in the Microcontroller 241, FIG. 2.

The communication control unit (CCU) of a shadow computer C, FIG. 1, recognizes a failure of a computer A or B, FIG. 1., of its fault-tolerant unit (FTU) by the missing messages of this computer and by the missing acknowledgments of these messages in the field 313, FIG. 3, of the successor FTU and the successor of the successor FTU. In such a situation, the communication control unit (CCU) of the shadow computer C, FIG. 1, acquires the sending time slot of the failed computer and becomes an active computer to restore the redundancy of the fault-tolerant unit within a short period of time.

According to this invention a fast reaction in emergency situations is realized by the provision of a number of mode-change bits 312, FIG. 3, in the control field 310 of each message. In the embodiment at issue, three such mode-change-bits 312 are provided. The communication control unit (CCU) can signal a mode change to an emergency mode by setting the respective mode change bit 312. At the latest, within a single transmission round, all other computers will react to the requested mode change.

In a fault-tolerant configuration, as depicted in FIG. 1, every active node computer A and B sends a physical message replicate on every one of the replicated buses 101 and 102. In total four physical message replicates will be transmitted for every logical message, implying a redundancy degree of four. The physical message allocation, i.e., the assignment of the physical messages to transmission slots as depicted in FIG. 7, is under the control of the message allocation field 434 of the MEDL in FIG. 4. If fast reaction is required, these four physical messages will be transmitted in two subsequent transmission slots. Such a tight message allocation has the advantage of minimal latency and the disadvantage of susceptibility to common mode disturbances.

Any common mode disturbance, e.g., caused by a faulty EMI (Electromagnetic Imission) protection of the ignition system in an automobile engine, that is longer than the intermessage gap 712 of FIG. 7a, can cause—in the worst case—the destruction of all four message replicas. If the application does not require the tight latency of two transmission slots, then it is expedient to interleave the messages of two or more FTUs, e.g., according to the scheme depicted in FIG. 7a. Given a redundancy degree of n, such an interleaved scheme is optimal if n-1 transmission slots can be mutilated without faulting the communication between any two FTUs.

FIG. 7b depicts an optimal allocation with a latency of four slots. All the messages in any three out of these four slots can be mutilated by a correlated transient disturbance without impeding the communication between FTUs. FIG. 7a depicts an optimal allocation in a system with eight FTUs with a latency of seven slots. This configuration tolerates correlated transient faults that destroy up to six consecutive slots 750 in FIG. 7c.

In the disclosed embodiment, a system configuration FIG. 1 for this new transmission method has been presented that meets the fault-tolerance objective stated in the summary: there is no single point of failure, i.e., the transient or permanent failure of any one of the components can be tolerated without any degradation of the service at the system level.

There are many applications where such a high degree of fault tolerance cannot be justified economically. For these applications the disclosed transmission method supports the combination of subsystems with differing degrees of fault tolerance.

For example, it is possible to eliminate some or all of the shadow computers or to assign only one node computer A, FIG. 1, to some of the fault-tolerant units FTU 1, FTU 2, FTU 3, or FTU 4 of FIG. 1. It is also possible to operate the system with only one transmission bus, 101, FIG. 1, and to eliminate the other one, bus 102, FIG. 1. An altogether non fault-tolerant configuration with respect to permanent faults has a single node only, A, of FIG. 1, in each FTU, and a single communication bus, 101, FIG. 1. But even in such a configuration it is possible to replicate the transmission of physical messages on the bus 101, FIG. 1 under the control of the MEDL field 434, FIG. 4 in the domain of time, such that transient disturbances on the transmission medium can be tolerated.

The disclosed embodiment of the communication controller for this innovative time-triggered communication method is based on a combination of off-the-shelf standard VLSI components that have been designed according to the prior art, and embedded software that executes the specified process steps of the method on the hardware depicted in FIG. 2. For a prototype implementation and usage in small numbers, the described implementation technology of this new communication method is optimal. However, if the market interest in this new technology increases, resulting in the demand for a large number of controllers, then a functionally equivalent ASIC (Application Specific Integrated Circuit) implementation of the disclosed method will become economically optimal. According to the present state of the VLSI technology, it is technologically possible now to implement the node computer of FIG. 2 on a single VLSI chip. In such a case, the building blocks of FIG. 2 can be optimized by eliminating all functions that are available in the general off-the-shelf components but are not needed for the implementation of the given method, and by mechanically translating some of the software code contained in the disclosed embodiment into a functionally equivalent hardware solution. Such an optimized VLSI implementation will drastically reduce the cost of a computer node and increase its performance without changing its functionality.

In the future it is foreseeable to implement the complete system depicted in FIG. 1 on a single VLSI chip. In this case the broadcast buses 101 and 102, FIG. 1, will be signal lines within this single chip.

The described invention significantly improves the efficiency of the communication in a real-time distributed system. Compared to other communication methods published in the literature (1992 SAE Handbook, Vol. pp. 20.301–20.302, Society of Automotive Engineers, 400 Commonwealth Drive, Warrendale, Pa., USA) such as J1850, CAN and the Token Slot Network, this invention improves the response-time by more than 50% and provides more services.

In summary, the following innovative features of this invention lead to a significant reduction in the length of messages and in the number of messages in a communication system for a fault-tolerant distributed real-time computer architecture:

(1) The assurance of the equality of the internal state of the sender and receiver without a need to exchange the state information explicitly by including the state information in the CRC calculation;

(2) The elimination of the acknowledgment messages by the introduction of a short acknowledgment field within each message;

(3) The implicit clock synchronization without having to send additional synchronization messages;

(4) The derivation of the message name from the a priori known point in time of sending and receiving of a message without having to send the message name explicitly;

(5) The provision of a mode change field in every message that provides the capability to request an immediate change of operating modes without the necessity of sending additional messages; and (6) The evaluation of the ratio of the incoming messages with a correct and an erroneous CRC field, to be able to determine without an explicit exchange of messages, if a receiver belongs to the majority of the operating communication control units.

In summary, the present invention is in no way constrained to the above described embodiment with four fault-tolerant units (FTU), but can be implemented with an arbitrary number of fault-tolerant units. Similarly, the configuration of a fault-tolerant unit is not constrained to two active computers and one shadow computer, where each computer has only one communication control unit. The communication system is not constrained to two communication buses, but such communication busses may—according to the required redundancy—be chosen accordingly, i.e., as "on-board" or "on-chip" connections.

I claim:

1. A method for the transmission of messages within a distributed real-time computer architecture with a global time base, comprising the steps of: providing a plurality of fault-tolerant units (FTUs) (110,120,120,140) where each fault-tolerant unit (FTU) contains at least one fail-silent computer (A,B,C) and where each computer has a communication control unit with at lease one communication port, whereby each fault-tolerant unit ($FTU_1$, $FTU_2$, $FTU_3$, $FTU_4$) is connected to every other (fault-tolerant unit ($FTU_1$, $FTU_2$, $FTU_3$, $FTU_4$) by at least one communication bus (101,102) and where the access to the communication buses (101,102) is determined by a cyclic time division multiple access scheme, which is derived from a global time base; providing each messages to be sent with a control field (310), a data field (320) and a CRC (Cyclic Redundancy Check) field (331,332), where the contents of the CRC field of normal messages, which are identified by a specified bit (311) of the control field (310) are calculated over the concatenation of the control field (310), the data field (320) and the local internal state of a sending communication control unit, and where the local internal state of such a communication control unit is composed of the concatenation of the current global time with a membership field, in which each fault-tolerant unit ($FTU_1$, $FTU_2$, $FTU_3$, $FTU_4$) is represented by a specified bit, the value TRUE of which means that said fault-tolerant unit is operating and the value FALSE means that said fault-tolerant unit is faulty; and, performing, in a receiving communication control unit, a CRC-check on the incoming messages using its internal state, for detecting a mutilated message as well as a deviation of the internal state of the receiving from the internal state of the sending communication control unit.

2. The method of claim 1 including the step of: marking, with a receiving communication control unit, a fault-tolerant unit ($FTU_1$, $FTU_2$, $FTU_3$, $FTU_4$) as faulty by setting the corresponding bit in its membership field to FALSE, if none of the expected messages with a correct CRC field (CRC) has been received in the timeslots that have been assigned to this sending unit.

3. The method of claim 1 including the step of: providing, in the control field (310), as a first bit, an initialization bit (311) for specifying whether the message is an initialization message or a normal message.

4. The method of claim 1 including the step of: providing, in the control field (310), a number of acknowledgment bits (313), by the means of which the correct receipt of one or more of the preceding messages is acknowledged, in order that each receiving communication control unit can determine by checking the control field of an incoming message, whether all its communication ports have been operational and whether it is a member of the majority of the set of operating communication control units by comparing the number of correctly received messages with the number of messages that were discarded because of failed CRC checks during the last time division multiple access cycle.

5. The method according to claim 3 including the step of: providing, in the control field (310), a number of mode change bits (312).

6. The method according to claim 1 including the step of: providing a mode field in the local internal state, which is included in the calculation of the CRC field of normal messages, and which is checked by the receiver.

7. The method according to claim 1 including the step of: deriving the message name from the prior determined point in time of sending and receiving the message, thus eliminating the need to carry a message-name field in the message.

8. The method according to claim 1 including the step of: establishing a global timebase in a distributed manner in each communication control unit; and determining the differences between the states of the clocks in the fault-tolerant units ($FTU_1$, $FTU_2$, $FTU_3$, $FTU_4$) on the basis of the a priori known points in time of sending a message and the locally measured points in time of receiving a message.

9. The method according to claim 1 including the step of: providing, for every logical message to be sent, a plurality of replicated physical message transmissions systematically interleaved with other replicated physical message transmissions of a predetermined number of other logical messages on the replicated communication channels in such a prior determined pattern that a correlated transmission error of known length that effects both channels can only mutilate such a subset of the replicated physical message transmissions that the communication between the FTUs is not disrupted.

10. A communication control unit for the transmission of messages within a distributed real-time computer architecture with a global time base, comprising a plurality of fault-tolerant units ($FTU_1$, $FTU_2$, $FTU_3$, $FTU_4$), each fault-tolerant unit (FTU) containing at least one fail-silent computer (A,B,C) and each computer having a communication control unit with at least one communication port, whereby each fault-tolerant unit ($FTU_1$, $FTU_2$, $FTU_3$, $FTU_4$) is connected to a communication bus (101,102) with every other fault-tolerant unit ($FTU_1$, $FTU_2$, $FTU_3$, $FTU_4$), the access to the communication bus (101,102) being determined by a cyclic time division multiple access scheme which is derived from a global time base, the communication control unit being realized as single chip control unit or as part of a single chip microcomputer, the communication control unit including means to construct the messages to be transmitted from a control field (310), a data field (320) and a CRC (Cyclic Redundancy Check) field (331,332), the contents of the CRC field of normal messages, identified by a specified bit (311) of the control field (310), being calculated over the concatenation of the control field (310), the data field (320) and the local internal state of a sending communication control unit and the communication control unit comprising means for maintaining a local internal state of the communication control unit that is composed of the concatenation of the current global time with a membership field, in which each fault-tolerant unit ($FTU_1$, $FTU_2$, $FTU_3$, $FTU_4$) is represented by a specified bit, in which the value TRUE means that said fault-tolerant unit is operating and the value FALSE means that said fault-tolerant unit is faulty, and a receiving communication control including means to perform a CRC-check on the incoming messages in order to detect a mutilated message as well as a deviation of the internal state of the receiving from the internal state of the sending communication control unit.

11. The communication control unit of claim 10 comprising two counters, one for counting the received messages with a correct CRC field and another one for counting the received messages with an erroneous CRC field.

12. The communication control unit of claim 10 comprising means to perform a mode change as soon as a message from another fault-tolerant unit ($FTU_1$, $FTU_2$, $FTU_3$, $FTU_4$) is received in which a respective bit in the mode field is set.

13. The communication control unit of claim 10 comprising means to measure the difference between the prior known point in time of expected arrival of a message and the actual point in time of receiving this message.

14. A method for the transmission of messages within a distributed real-time computer architecture having a global time base, comprising the steps of: providing a plurality of fault-tolerant units; providing each fault-tolerant unit with at least one fail-silent computer and providing each computer with a communication control unit having at least one communication port; connecting each fault-tolerant unit to every other fault-tolerant unit by at least one communication bus; determining the access to the communication buses by a cyclic time division multiple access scheme derived from the global time base; providing each message to be sent with a control field, a data field and a CRC (Cyclic Redundancy Check) field; calculating the contents of the CRC field of normal messages, which are identified by a specified bit of the control field, over the concatenation of the control field, the data field and the local internal state of a sending communication control unit; providing the local internal state of such a sending communication control unit by concatenating the current global time with a membership field; representing each fault-tolerant unit by a specified bit in the membership field, the value TRUE of which means that said fault-tolerant unit is operating and the value FALSE of which means that said fault-tolerant unit is faulty; and, performing, in a receiving communication control unit, a CRC-check on the incoming messages using its internal state, for detecting a mutilated message as well as a deviation of the internal state of the receiving communication control unit from the internal state of the sending communication control unit.

15. A communication control unit for the transmission of messages within a distributed real-time computer architecture having a global time base, said architecture comprising a plurality of fault-tolerant units, each fault-tolerant unit containing at least one fail-silent computer and each microcomputer having a communication control unit with at least one communication port, a communication bus, each fault-tolerant unit being connected to said communication bus, the access to the communication bus being determined by a cyclic time division multiple access scheme which is derived from the global time base, the communication control unit being realized as single chip control unit or as part of a single chip microcomputer, the communication control unit including means to construct the messages to be transmitted from a control field, a data field and a CRC (Cyclic Redundancy Check) field, the contents of the CRC field of normal messages, identified by a specified bit of the control field, being calculated over the concatenation of the control field, the data field and the local internal state of a sending communication control unit, the communication control unit further comprising means for maintaining a local internal state of the communication control unit that is composed of the concatenation of the current global time with a membership field, in which each fault-tolerant unit is represented by a specified bit, the TRUE value of which means that said fault-tolerant unit is operating and the FALSE value of which means that said fault-tolerant unit is faulty, and a receiving communication control unit including means to perform a CRC-check on the incoming messages by using its internal state in order to detect a mutilated message as well as a deviation of the internal state of the receiving communication control unit from the internal state of the sending communication control unit.

* * * * *